United States Patent [19]

Chen et al.

[11] Patent Number: 5,464,698
[45] Date of Patent: Nov. 7, 1995

[54] FUSER MEMBERS OVERCOATED WITH FLUOROCARBON ELASTOMER CONTAINING TIN OXIDE

[75] Inventors: Jiann H. Chen, Fairport; John J. Fitzgerald; William B. Vreeland, II, both of Webster; Wayne T. Ferrar, Fairport; Gary F. Roberts, Macedon; William J. Staudenmayer, Pittsford, all of N.Y.

[73] Assignee: Eastman Kodak Company, Rochester, N.Y.

[21] Appl. No.: 268,140

[22] Filed: Jun. 29, 1994

[51] Int. Cl.$^6$ .................................. B32B 27/00
[52] U.S. Cl. .................. 428/421; 428/35.8; 428/330; 428/411.1; 428/457; 428/906; 355/284; 219/216; 430/98; 430/99; 430/124; 492/53; 492/54; 492/56
[58] Field of Search ............... 428/35.8, 36.9, 428/447, 411.1, 330, 421, 457, 906; 492/56, 35.8, 53, 54; 528/10; 355/284; 219/216; 430/98, 99, 124

[56] References Cited

U.S. PATENT DOCUMENTS

| | | | |
|---|---|---|---|
| 4,257,699 | 3/1981 | Lentz | 355/3 |
| 4,264,181 | 4/1981 | Lentz et al. | 355/3 |
| 4,272,179 | 6/1981 | Seanor | 355/3 |
| 4,373,239 | 2/1983 | Henry et al. | 29/132 |
| 4,430,406 | 2/1984 | Newkirk et al. | 430/99 |
| 4,515,884 | 5/1985 | Field et al. | 430/99 |
| 4,518,655 | 5/1985 | Henry et al. | 428/329 |
| 4,970,098 | 11/1990 | Ayala-Esquilin et al. | 428/36.6 |
| 5,017,432 | 5/1991 | Eddy et al. | 428/422 |
| 5,269,740 | 12/1993 | Fitzgerald et al. | 492/36 |
| 5,292,562 | 3/1994 | Fitzgerald et al. | 428/35.8 |
| 5,292,606 | 3/1994 | Fitzgerald | 428/147 |

OTHER PUBLICATIONS

J. J. Fitzgerald et al., "The Effect of Cyclic Stress on the Physical Properties of a Poly(Dimethylsiloxane) Elastomer", *Polymer Engineering and Science*, (Sep. 1992), vol. 32, No. 18, pp. 1350–1357.

Primary Examiner—Patrick J. Ryan
Assistant Examiner—William A. Krynski
Attorney, Agent, or Firm—Anne B. Kiernan; Robert Luke Walker

[57] ABSTRACT

A fuser member useful for heat-fixing an electrographic toner to a substrate. The fuser member has a core and a layer overlying the core. That layer includes a cured fluorocarbon random copolymer having subunits with the general structures:

$$-(CH_2CF_2)_x-, -(CF_2CF_2)_z-,$$

and $$-(CF_2CF)_y-;$$
$$\phantom{-(CF_2C}|$$
$$\phantom{-(CF_2CF)_y}CF_3$$

where x is from 30 to 90 mole percent, y is from 10 to 70 mole percent, and z is from 0 to 34 mole percent. The layer incorporates particulate filler. The filler includes tin oxide and a material selected from the group consisting of alkali metal oxides, alkali metal hydroxides, and combinations thereof. The filler has a total concentration in the layer of from about 25 to 50 percent of the total volume of the layer. The tin oxide has a concentration of from 20 to 40 percent of the total volume of the layer.

11 Claims, 6 Drawing Sheets

FUSER MEMBERS OVERCOATED WITH FLUOROCARBON ELASTOMER CONTAINING TIN OXIDE

FIELD OF THE INVENTION

This invention relates to fuser members useful for heat-fixing a heat-softenable toner material to a substrate. More particularly, the invention relates to fuser members overcoated with fluorocarbon elastomer containing tin oxide.

BACKGROUND OF THE INVENTION

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of another substrate, such as, e.g., a receiver sheet comprising paper or a transparent film, where it is then fixed in place to yield the final desired toner image.

When heat-softenable toners, comprising, e.g., thermoplastic polymeric binders, are employed, the usual method of fixing the toner in place involves applying heat to the toner once it is on the receiver sheet surface to soften it and then allowing or causing the toner to cool.

One such well-known fusing method comprises passing the toner-bearing receiver sheet through the nip formed by a pair of opposing rolls, at least one of which (usually referred to as a fuser roll) is heated and contacts the toner-bearing surface of the receiver sheet in order to heat and soften the toner. The other roll (usually referred to as a pressure roll) serves to press the receiver sheet into contact with the fuser roll. In some other fusing methods, the configuration is varied and the "fuser roll" or "pressure roll" takes the form of a flat plate or belt. The description herein, while generally directed to a generally cylindrical fuser roll in combination with a generally cylindrical pressure roll, is not limited to fusing systems having members with those configurations. For that reason, the term "fuser member" is generally used herein in place of "fuser roll" and the term "pressure member" in place of "pressure roll".

The fuser member usually comprises a rigid core covered with a resilient material, which will be referred to herein as a "base cushion layer." The resilient base cushion layer and the amount of pressure exerted by the pressure member serve to establish the area of contact of the fuser member with the toner-bearing surface of the receiver sheet as it passes through the nip of the fuser member and pressure members. The size of this area of contact helps to establish the length of time that any given portion of the toner image will be in contact with and heated by the fuser member. The degree of hardness (often referred to as "storage modulus") and stability thereof, of the base cushion layer are important factors in establishing and maintaining the desired area of contact.

In some previous fusing systems, it has been advantageous to vary the pressure exerted by the pressure member against the receiver sheet and fuser member. This variation in pressure can be provided, for example in a fusing system having a pressure roll and a fuser roll, by slightly modifying the shape of the pressure roll. The variance of pressure, in the form of a gradient of pressure that changes along the direction through the nip that is parallel to the axes of the rolls, can be established, for example, by continuously varying the overall diameter of the pressure roll along the direction of its axis such that the diameter is smallest at the midpoint of the axis and largest at the ends of the axis, in order to give the pressure roll a sort of "bow tie" or "hourglass" shape. This will cause the pair of rolls to exert more pressure on the receiver sheet in the nip in the areas near the ends of the rolls than in the area about the midpoint of the rolls. This gradient of pressure helps to prevent wrinkles and cockle in the receiver sheet as it passes through the nip. Over time, however, the fuser roll begins to permanently deform to conform to the shape of the pressure roll and the gradient of pressure is reduced or lost, along with its attendant benefits. It has been found that permanent deformation (alternatively referred to as "creep") of the base cushion layer of the fuser member is the greatest contributor to this problem.

Particulate inorganic fillers have been added to base cushion layers to improve mechanical strength and thermal conductivity. High thermal conductivity is advantageous when the fuser member is heated by an internal heater, so that the heat can be efficiently and quickly transmitted toward the outer surface of the fuser member and toward the toner on the receiver sheet it is intended to contact and fuse. High thermal conductivity is not so important when the roll is intended to be heated by an external heat source.

Optimal metal-particle filled elastomer fuser members have long been sought. At one time, it was predicted that:

"The metal of the metal-containing filler dispersed in the elastomer may be easily selected by one skilled in the art without undue experimentation by testing the metal-containing filler, such as a metal, metal alloy, metal oxide, metal salt or other metal compound, in an elastomer. The general classes of metals which are applicable to the present invention include those metals of Groups 1b, 2a, 2b, 3a, 3b, 4a, 4b, 5a, 5b, 6b, 7b, 8 and the rare earth elements of the Periodic Table." (U.S. Pat. No. 4,264,181 to Lentz et al, column 10, lines 42–53; also U.S. Pat. No. 4,272,179 to Seanor, column 10, lines 45–54.)

This prediction of easy selection of the metal for a metal-containing filler has proven false in the face of latter efforts in the art.

A metal-containing filler which provides good results in one elastomer may provide very poor results in another elastomer, even if the elastomers are very similar.

U.S. Pat. No. 4,515,884 to Field et al, discloses a fuser member which utilizes metal oxide filled polydimethylsiloxane. The metal oxides are iron oxide and tabular alumina. Calcined alumina is described as being unsuitable per se. (column 9. line 50—column 10 line 47)

In U.S. Pat. No. 4,264,181 to Lentz et al, good results were obtained when lead oxide was used as a filler in various fluorocarbon elastomers (Viton E430, Viton E60C, Viton GH; Examples X, XI, XII). In U.S. Pat. No. 5,017,432 to Eddy et al, on the other hand, the use of lead oxide in similar fluorocarbon elastomers (for example, Viton GF) is taught against on the basis that it would produce an unacceptable fuser member. In these fluoroelastomers, cupric oxide is preferred.

U.S. Pat. No. 4,272, 179 to Seanor and U.S. Pat. Nos. 4,264,181 and 4,257,699 to Lenz teach the use, as a release oil, of a polydimethylsiloxane that incorporates mercapto functional groups. These patents indicate that lead oxide filler in the outer elastomer layer interacts with the mercapto functionalized PDMS fluid to yield a release film on the surface of the fuser member.

An additional difficulty that has faced those attempting to produce metal-filled elastomer fuser members has recently been identified. In the past, it was thought that various materials' suitability for use in fuser member layers in terms of their stability during use—i.e., their ability to resist degradation (as evidenced by weight loss), creep, and changes in hardness, during use in fuser members—could be determined by subjecting samples of the materials to conditions of continuous high temperature and continuous high stress (i.e., pressure), and then measuring the resultant changes in weight, shape (e.g., length), and hardness (e.g., storage modulus). However, J. J. Fitzgerald et al, "The Effect of Cyclic Stress on the Physical Properties of a Poly(Dimethylsiloxane) Elastomer", *Polymer Engineering and Science,* Vol. 32, No. 18, (September, 1992), pp. 1350– 1357; indicates that such testing does not accurately portray the stability the materials will exhibit during actual use in fuser member base cushion layers and that dynamic testing, with cycles of loading and unloading is necessary. The publication cites other reports showing the same kind of results in studies of other elastomers. Accordingly, a device called a Mechanical Energy Resolver (sometimes alternatively referred to herein as an "MER") has been developed, which can be used to test samples of materials of interest for use in fuser member layers. The device applies heat continuously to maintain the samples at a constant elevated temperature. The device also applies stress to the samples in the form of a compressive force, but does so in a manner such that the amount of compressive force applied varies cyclicly (i.e., sinusoidally). The results of such testing consistently correlate with, and therefore reliably predict, the degree of stability a material will exhibit in a fuser member during actual use.

The realization of the need for dynamic testing has promised more accurate evaluation of filled elastomers, however, preparation of metal containing elastomers remains problematic. U.S. Pat. No. 4,515,884 to Field et al, and U.S. Pat. No. 5,017,432 to Eddy et al, cite large numbers of critical features or important aspects of their metal containing elastomers: choice of material (Field, column 9, lines 50–65 and column 10, lines 24–25), interaction of filler surface and elastomer (Field, column 9, lines 32–65), particle size (Field, column 10, lines 1–8 and lines 25–30; Eddy, column 9, line 65—column 10, line 3), concentration of metal-filler (Field, column 10, lines 9–23 and lines 31–47), capability of interacting with functional groups of release agent (Eddy, column 9, lines 26–30), reactivity of the metal filler with the elastomer (Eddy, column 9, lines 33–43), and acid-base characteristics of the metal filler (Eddy, column 9, lines 43–56). The lists of critical features and important aspects in Field and Eddy do not fully correlate. It is unknown whether this difference represents real differences in material characteristics or only differences in techniques and analysis.

In electrophotographic fuser systems, fuser memberers are commonly made with an overcoat layer of polysiloxane elastomer, polyfluorocarbon resin, or polyfluorocarbon elastomer.

Polysiloxane elastomers have relatively high surface energy and relatively low mechanical strength, but are adequately flexible and elastic and can produce high quality fused images. After a period of use, however, the self release property of the roller degrades and offset begins to occur. Application of a polysiloxane fluid during roller use enhances te ability of the roller to release toner, but shortens roller life due to oil absorption. Oiled portions tend to swell and wear and degrade faster.

One type of material that has been widely employed in the past to form a resilient base cushion layer for fuser rolls is condensation-crosslinked siloxane elastomer. Disclosure of filled condensation-cured poly(dimethylsiloxane) "PDMS" elastomers for fuser rolls can be found, for example, in U.S. Pat. Nos. 4,373,239; 4,430,406; and 4,518,655. U.S. Pat. No. 4,970,098 to Ayala-Esquillin et al teaches a condensation cross-linked diphenylsiloxanedimethylsiloxane elastomer having 40 to 55 weight percent zinc oxide, 5 to 10 weight percent graphite, and 1 to 5 weight percent ceric dioxide.

A widely used siloxane elastomer is a condensation-crosslinked PDMS elastomer, which contains about 32–37 volume percent aluminum oxide filler and about 2–6 volume percent iron oxide filler, and is sold under the trade name, EC4952, by the Emerson Cummings Co., U.S.A. It has been found that fuser rolls containing EC4952 cushion layers exhibit serious stability problems over time of use, i.e., significant degradation, creep, and changes in hardness, that greatly reduce their useful life. MER test results correlate with and thus accurately predict the instability exhibited during actual use. Nevertheless, materials such as EC4952 initially provide very suitable resilience, hardness, and thermal conductivity for fuser roll cushion layers.

Some filled condensation-crosslinked PDMS elastomers are disclosed in U.S. Pat. No. 5,269,740 (copper oxide filler), U.S. Pat. No. 5,292,606 (zinc oxide filler), U.S. Pat. No. 5,292,562 (chromium oxide filler), U.S. patent application Ser. No. 08/167,584 (tin oxide filler), U.S. patent application Ser. No. 08/159,013 (nickel oxide filler). These materials all show much less change in hardness and creep than EC4952 or the PDMS elastomer with aluminum oxide filler. U.S. Pat. No. 5,292,606 and U.S. patent application Ser. No. 08/167,584 disclose that tin oxide filler and zinc oxide filler can provide very good results in PDMS.

Fluorocarbon resins like polytetrafluoroethylene (PTFE) or a copolymer of PTFE and perfluoroalkylvinylether, or fluorinated ethylenpropylene have excellent release characteristics due to very low surface energies, high temperature resistance, and excellent chemical resistance. Fluorocarbon resins are, however, less flexible and elastic than polysiloxane elastomers.

Polyfluorocarbon elastomers, such as vinylene fluoride-hexafluoropropylene copolymers, are tough, flexible elastomers that have excellent high temperature resistance, but relatively high surface energies, which compromise toner release, and poor thermal conductivity.

It would be desirable to provide a fuser member with an overcoat layer that includes a polyfluorocarbon elastomer, but has a moderate surface energy.

SUMMARY OF THE INVENTION

The invention provides a fuser member useful for heat-fixing an electrographic toner to a substrate. The fuser member has a core and a layer overlying the core. That layer includes a cured fluorocarbon random copolymer having subunits with the general structures:

—$(CH_2CF_2)_x$—, —$(CF_2CF_2)_z$—, and $$-(CF_2CF)_y-;\quad\overset{\mid}{CF_3}$$

where x is from 30 to 90 mole percent, y is from 10 to 70 mole percent, and z is from 0 to 34 mole percent. The layer incorporates particulate filler. The filler includes tin oxide and a material selected from the group consisting of alkali metal oxides, alkali metal hydroxides, and combinations thereof. The filler has a total concentration in the layer of from about 25 to 50 percent of the total volume of the layer. The tin oxide has a concentration of from 20 to 40 percent of the total volume of the layer.

The invention provides a fuser member with a layer that includes a metal oxide filled polyfluorocarbon elastomer that has a moderate surface energy.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF PARTICULAR EMBODIMENTS

The fuser roll of the invention has a core, a base cushion superimposed on the core and an outer layer superimposed on the base cushion.

The outer or "overcoat" layer comprises a cured fluorocarbon random copolymer having subunits with the following general structures:

—(CH$_2$CF$_2$)$_x$— (vinylidene fluoride subunit ("VF")),

—(CF$_2$CF$_2$)$_z$— (tetrafluoroethylene subunit ("TFE")), and $$-(CF_2CF)_y-$$
with CF$_3$ branch
(hexafluoropropylene subunit ("HFP")).

In these formulas, x, y, and z are mole percentages of the individual subunits relative to a total of the three subunits (x+y+z), referred to herein as "subunit mole percentages" (The curing agent can be considered to provide an additional "cure-site subunit", however, the contribution of these cure-site subunits is not considered in subunit mole percentages.) In the fluorocarbon copolymer, x has a subunit mole percentage of from 30 to 90 mole percent, y has a subunit mole percentage of from 10 to 70 mole percent, and z has a subunit mole percentage of from 0 to 34 mole percent. In a currently preferred embodiment of the invention, subunit mole percentages are: x is from 40 to 80, y is from 10 to 60, and z is from 0 to 34; or more preferably x is from 42 to 75, y is from 14 to 58, and z is 0. In the currently preferred embodiments of the invention, x, y, and z are selected such that fluorine atoms represent at least 70 percent of the total formula weight of the VF, HFP, and TFE subunits.

The outer layer includes particulate filler comprising tin oxide and additional particulate selected from alkali metal oxides, alkali metal hydroxides, and combinations of alkali metal oxides and hydroxides. In a currently preferred embodiment of the invention, the additional particulate is a mixture of magnesium oxide and calcium hydroxide. The particulate filler has a total concentration in the outer layer of from about 25 to 50 percent of the total volume of the outer layer. The tin oxide has a concentration of from about 20 to 40 percent of the total volume of the outer layer. The tin oxide particles comprise from 20 to 40 percent of the total volume of the base cushion layer. Concentrations of tin oxide of less than 20 volume percent may not provide the degree of stability desired to the layer. Concentrations of tin oxide of greater than 40 volume percent will render the layer too hard to provide the desired area of contact with the toner-bearing receiver sheet. In a particular embodiment of the invention, the outer layer has 3 volume percent MgO, 6 volume percent Ca(OH)$_2$ and from 20 to 40 volume percent tin oxide. The tin oxide particles comprise from 20 to 40 percent of the total volume of the base cushion layer.

The tin oxide particles employed as filler in the base cushion layer of a fuser member of the invention can be obtained from any convenient commercial source, e.g., Magnesium Electron, Inc. of Flemington, N.J. The particle size does not appear to be critical. Particle sizes anywhere in the range of 0.1 to 100 micrometers have been found to be acceptable. In the examples presented below the tin oxide particles were from 1 to 40 micrometers in diameter.

To form the outer layer, the filler particles are mixed with the uncured polymer, crosslinking agent, and any other additives, such as an accelerator; shaped over the base cushion, and cured. The fluorocarbon is cured by crosslinking with basic nucleophile. Basic nucleophilic cure systems are well known and are discussed, for example, in U.S. Pat. No. 4,272,179. One example of such a cure system combines a bisphenol as the crosslinking agent and an organophosphonium salt, as an accelerator. An example bisphenol is:

An example organophosphonium salt is:

The crosslinker is incorporated into the polymer as a cure-site subunit, for example, bisphenolic residues. Other examples of nucleophilic addition cure systems are sold commercially as DIAK No. 1 (hexamethylenediamine carbamate) and DIAK No. 3 (N,N'-dicinnamylidene-1,6-hexanediamine) by E.I. dupont de Nemours & Co.

Suitable uncured polymers are available commercially. In a particular embodiment of the invention, a vinylidene fluoride-co-hexafluoropropylene was used which can be represented as $—(VF)_{75}—(HFP)_{25}—$. This material is marketed by E.I. dupont de Nemours and Company under the designation "Viton A" and is referred to herein as "Viton A". In another embodiment of the invention, a vinylidene fluoride-co-hexafluoropropylene was used which can be represented as $—(VF)_{42}—(HFP)_{58}—$. This material is marketed by Minnesota Mining and Manufacturing, St. Paul, Minn., under the designation "Fluorel FX-2530" and is referred to herein as "FX-2530". Other suitable uncured vinylidene fluoride-co-hexafluoropropylenes and vinylidene fluoride-co-tetrafluoroethylene-co-hexafluoropropylenes are available, for example, Fluorel FX-9038.

The molecular weight of the uncured polymer is largely a matter of convenience, however, an excessively large or excessively small molecular weight would create problems, the nature of which are well known to those skilled in the art. In a preferred embodiment of the invention the uncured polymer has a number average molecular weight in the range of about 100,000 to 200,000.

In cases where it is intended that the fuser member be heated by an internal heater, it is desirable that outer layer have a relatively high thermal conductivity, so that the heat can be efficiently and quickly transmitted toward the outer surface of the fuser member that will contact the toner intended to be fused. (Depending upon relative thicknesses, it is generally even more desirable that the base cushion layer and any other intervening layers have a relatively high thermal conductivity. Suitable materials for the base cushion layer are discussed below.) The outer layer of the fuser member of the invention has a thermal conductivity in the range of about 0.15 to 0.40 BTU/hr·ft·°F. This is comparable to previously known base cushion layer formulations, such as the above discussed EC4952.

Some fusing systems use a release oil, such as a PDMS oil, to prevent offset, that is, to aid the roll in releasing from the toner it contacts during the fusing operation. During use, the oil is continuously coated over the surface of the fuser member in contact with the toner image. The fuser member of the invention can be used with polydimethylsiloxane or mercapto functionalized polydimethylsiloxane release oils at normally used application rates or at reduced application rates, from about 0.5 mg/copy to 10 mg/copy (the copy is 8.5 by 11 inch 20 pound bond paper.

The outer layer of the fuser member of the invention is substantially resistant to release oil induced swelling. In a preferred embodiment of the invention, the change in size due to swelling is less than 0.1 to 1.0 percent. In an even more preferred embodiment of the invention, the change in size due to swelling is less than 0.01 to 0.1 percent.

The thicknesses of the base cushion and outer layers and the composition of the base cushion layer can be chosen so that the base cushion layer can provide the desired resilience to the fuser member, and the outer layer can flex to conform to that resilience. The thickness of the base cushion and outer layers will be chosen with consideration of the requirements of the particular application intended. Usually, the outer layer would be thinner than the base cushion layer. For example, base cushion layer thicknesses in the range from 0.6 to 5.0 mm have been found to be appropriate for various applications. In some embodiments of the present invention, the base cushion layer is about 2.5 mm thick, and the outer layer is from about 25 to 30 micrometers thick.

Suitable materials for the base cushion layer include any of a wide variety of materials previously used for base cushion layers, such as the condensation cured polydimethylsiloxane marketed as EC4952 by Emerson Cuming. An example of a condensation cured silicon rubber base cushion layer is GE 4044 marketed by General Electric of Waterford, N.Y. An example of an addition cured silicone rubber is Silastic J RTV marketed by Dow Corning applied over a silane primer DC-1200 also marketed by Dow Corning.

In a particular embodiment of the invention, the base cushion is resistant to cyclic stress induced deformation and hardening. Such materials when subjected to cyclic stress using an MER, as above discussed, exhibit changes in length and hardness (storage modulus) of less than about 20 percent. Examples of suitable materials are filled condensation-crosslinked PDMS elastomers disclosed in U.S. Pat. No. 5,269,740 (copper oxide filler), U.S. Pat. No. 5,292,606 (zinc oxide filler), U.S. Pat. No. 5,292,562 (chromium oxide filler), U.S. patent application Ser. No. 08/167,584 (tin oxide filler), U.S. patent application Ser. No. 08/159,013 (nickel oxide filler). These materials all show reasonable heat conductivities and much less change in hardness and creep than EC4952 or the PDMS elastomer with aluminum oxide filler. Additional suitable base cushions are disclosed in U.S. patent application Ser. No. 08/268,136, entitled "Zinc Oxide Filled Diphenylsiloxane-Dimethylsiloxane Fuser Roll for Fixing Toner to a Substrate", filed contemporaneously with this application, by John J. Fitzgerald et al; U.S. patent application Ser. No.08/268,141, entitled "Tin Oxide Filled Diphenylsiloxane-Dimethylsiloxane Fuser Roll for Fixing Toner to a Substrate", filed contemporaneously with this application, by John J. Fitzgerald et al; U.S. patent application Ser. No. 08/268,131, entitled "Tin Oxide Filled Dimethylsiloxane-Fluoroalkylsiloxane Fuser Roll for Fixing Toner to a Substrate", filed contemporaneously with this application, by Wayne Thomas Ferrar et al. The patents and patent applications mentioned in this paragraph are hereby incorporated herein by reference.

The core of the fuser member is usually cylindrical in shape. It comprises any rigid metal or plastic substance. Metals are preferred when the fuser member is to be internally heated, because of their generally higher thermal conductivity. Suitable core materials include, e.g., aluminum, steel, various alloys, and polymeric materials such as thermoset resins, with or without fiber reinforcement. The core can be a support which has been conversion coated and primed with metal alkoxide primer in accordance with a U.S. patent application filed by Allen Kass, Oct. 21, 1993, entitled "FUSING MEMBER FOR ELECTROSTATOGRAPHIC REPRODUCING APPARATUS AND METHOD FOR PREPARING FUSING MEMBER"; the specification of which is hereby incorporated by reference herein.

The fuser member is mainly described herein in terms of embodiments in which the fuser member is a fuser roll having a core, a base cushion layer overlying the core, and an outer layer superimposed on the base cushion. The invention is not, however, limited to a roll, nor is the invention limited to a fusing member having a core bearing two layers: the base cushion layer and the outer layer. The fuser member of the invention can have a variety of outer configurations and layer arrangements known to those skilled in the art. For example, the base cushion layer could be eliminated or the outer layer described herein could be overlaid by one or more additional layers.

The invention is further illustrated by the following Examples and Comparative Examples.

EXAMPLES 1–2

A cylindrical stainless steel core was cleaned with dichloromethane and dried. The core was then primed with a uniform coat of a metal alkoxide type primer, Dow™ 1200 RTV Prime Coat primer, marketed by Dow Corning Corporation of Midland, Mich.; which contains: light aliphatic petroleum naptha (85 weight percent), tetra (2-methoxyethoxy)-silane (5 weight percent), tetrapropyl orthosilicate (5 weight percent), and tetrabutyl titanate (5 weight percent). Silastic® J RTV room temperature vulcanizing silicone rubber, marketed by Dow Corning Corporation of Midland, Mich.; was then mixed with catalyst and injection molded onto the core and cured at 232° C. for 2 hours under 75 tons/inch$^2$ of pressure. The roller was then removed from the mold and baked in a convection oven with a temperature ramp increasing to 232° C. substantially uniformly over 24 hours and then maintaining that temperature for an additional 24 hours. After air cooling, EC4952 marketed by Emerson Cumming Division of W. R. Grace and Co. of Connecticut was blade coated directly onto the Silastic J layer, then cured for 12 hours at about 210° C., followed by 48 hours at 218° C. in a convection oven. After air cooling, the EC4952 was ground to a thickness of 20 mils. The cured EC4952 was corona discharged for 15 minutes at 750 watts and an outer layer was applied.

Fluorocarbon polymer was mixed as indicated in Table 1, as a 25 weight percent solids solution in a 1 to 1 mixture of methyl ethyl ketone and methyl isobutyl ketone. The resulting material was ring coated onto the cured EC4952 layer, air dried for 16 hours, baked with ramping for 4 hours to 205° C. and then maintaining at 205° C. for 12 hours. The Silastic J layer had a thickness of 380 mils. The resulting outer layer of fluorocarbon polymer had a thickness of 1 mil.

Figure 1:
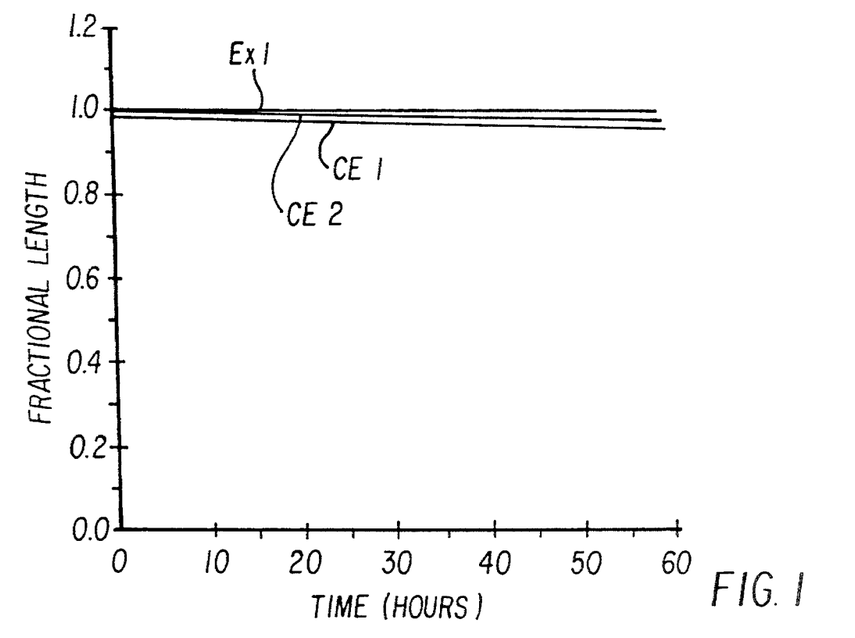
FIG. 1 is a graph of fractional length vs. time for the materials of Example 1 and Comparative Examples 1–2.
Figure 2:
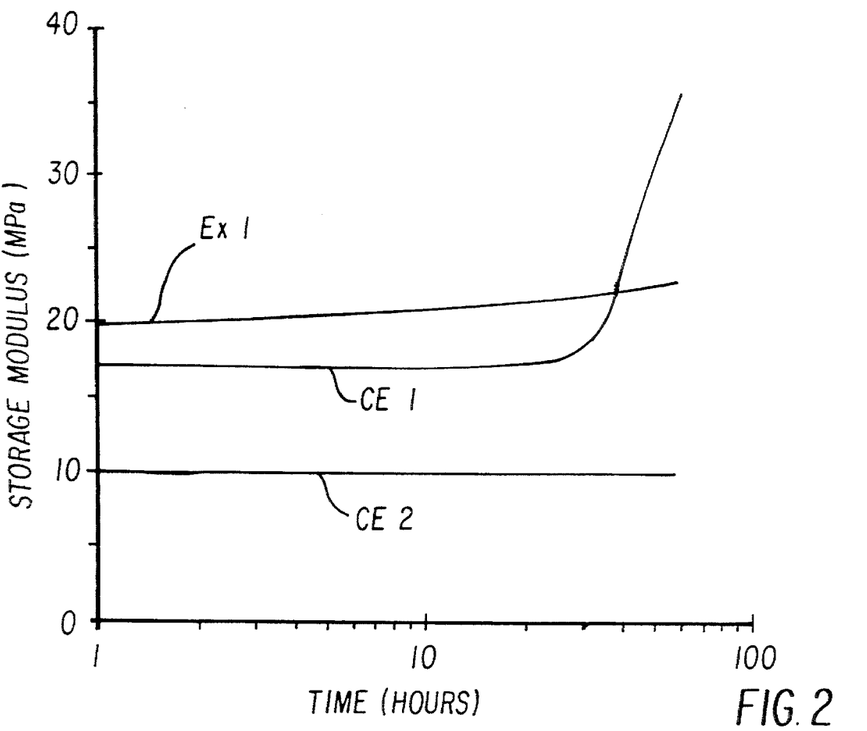
FIG. 2 is a graph of storage modulus vs. time for the materials of Example 1 and Comparative Examples 1–2.
Figure 3A:
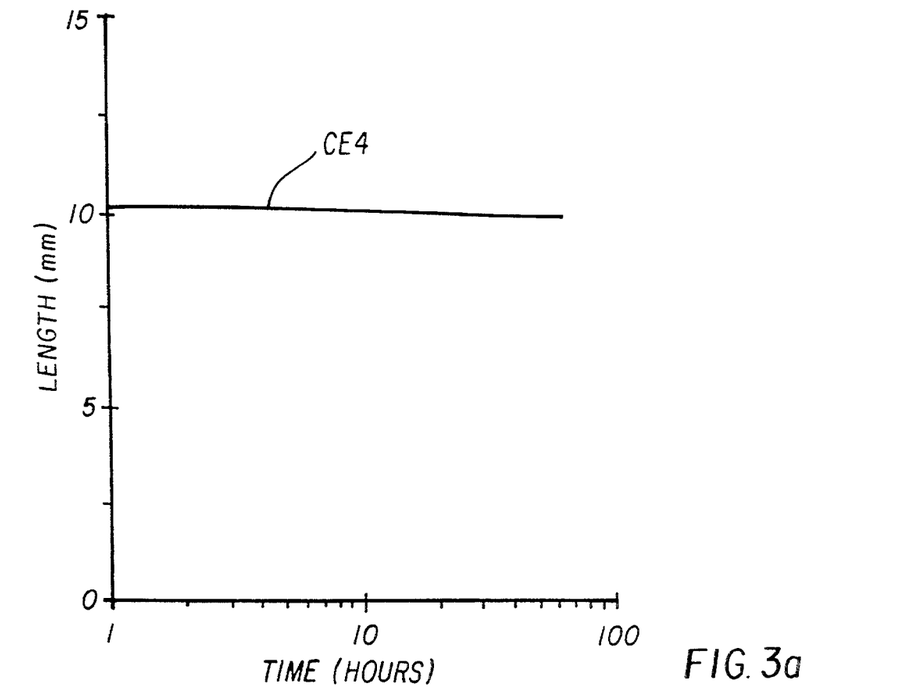
FIG. 3a is a graph of fractional length vs. time for the material of Comparative Example 4.
Figure 3B:
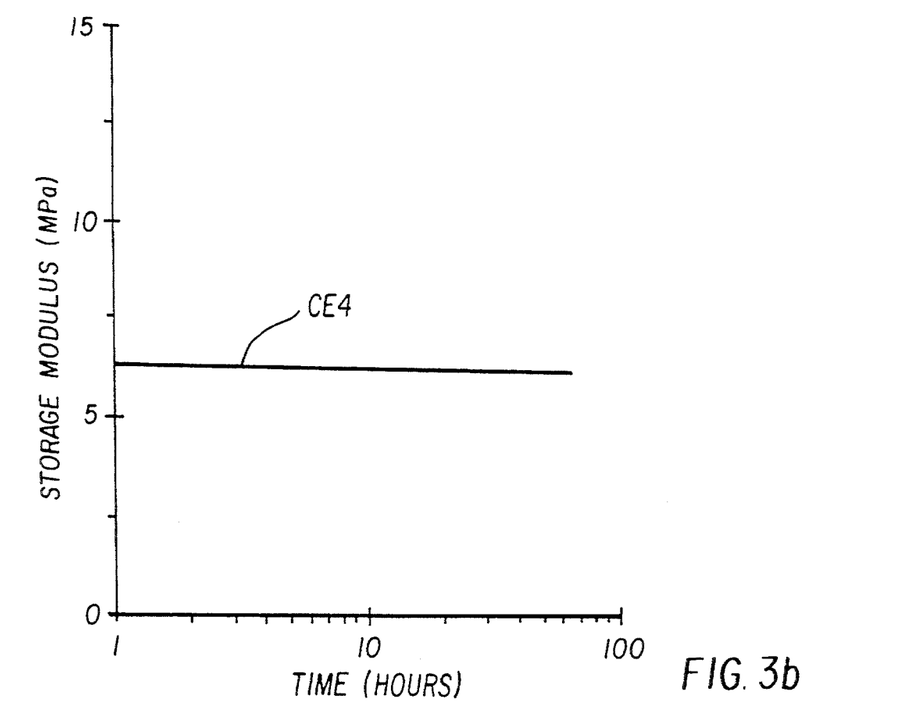
FIG. 3b is a graph of storage modulus vs. time for the material of Comparative Example 4.
Figure 4A:
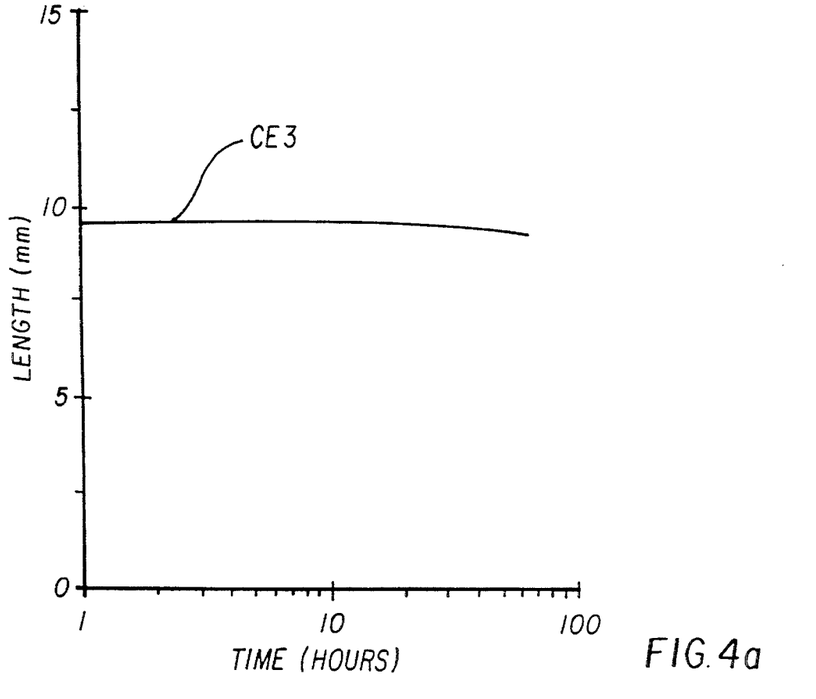
FIG. 4a is a graph of fractional length vs. time for the material of Comparative Example 3.
Figure 4B:
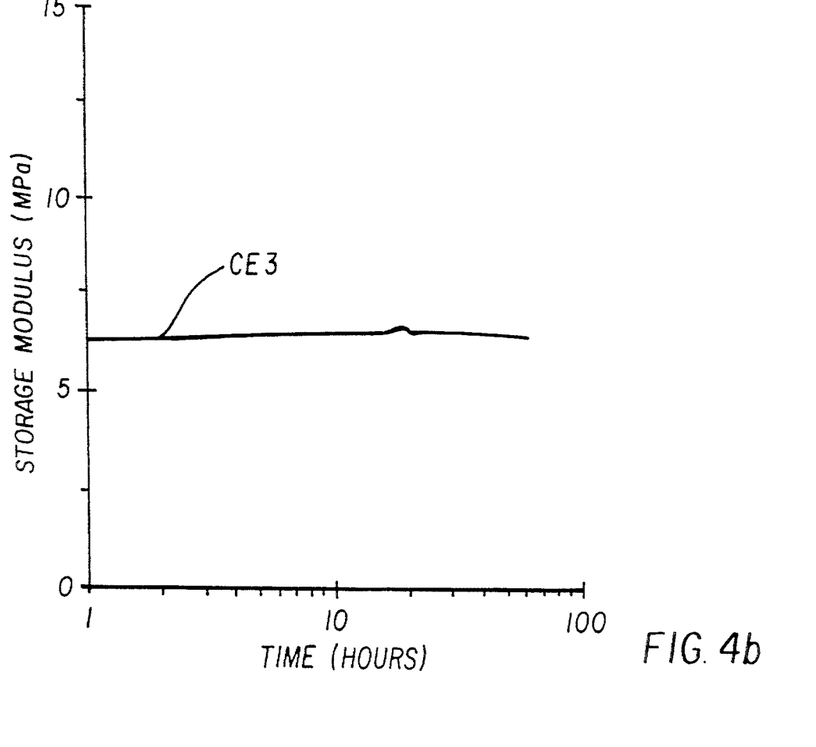
FIG. 4b is a graph of storage modulus vs. time for the material of Comparative Example 3.
Figure 5A:
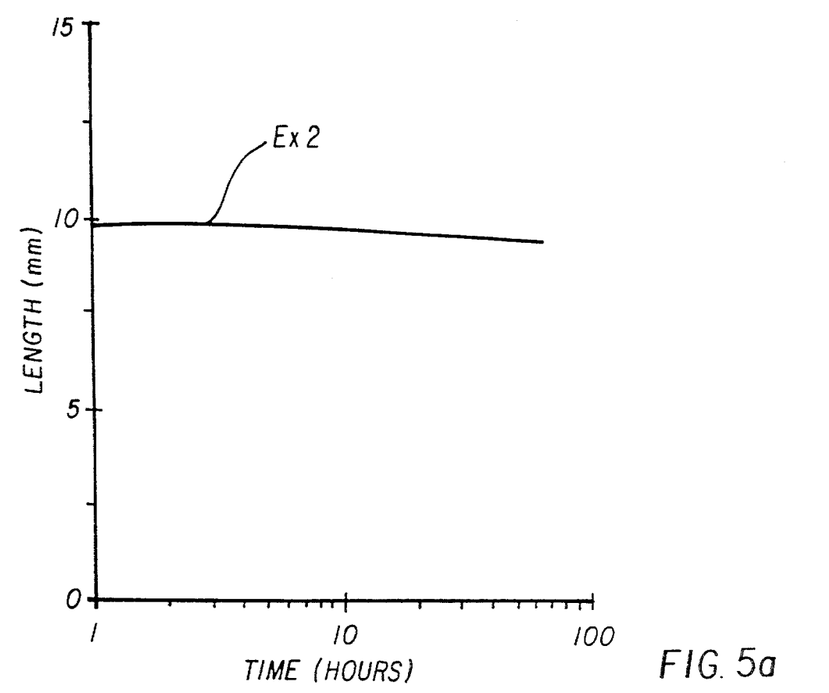
FIG. 5a is a graph of fractional length vs. time for the material of Example 2.
Figure 5B:
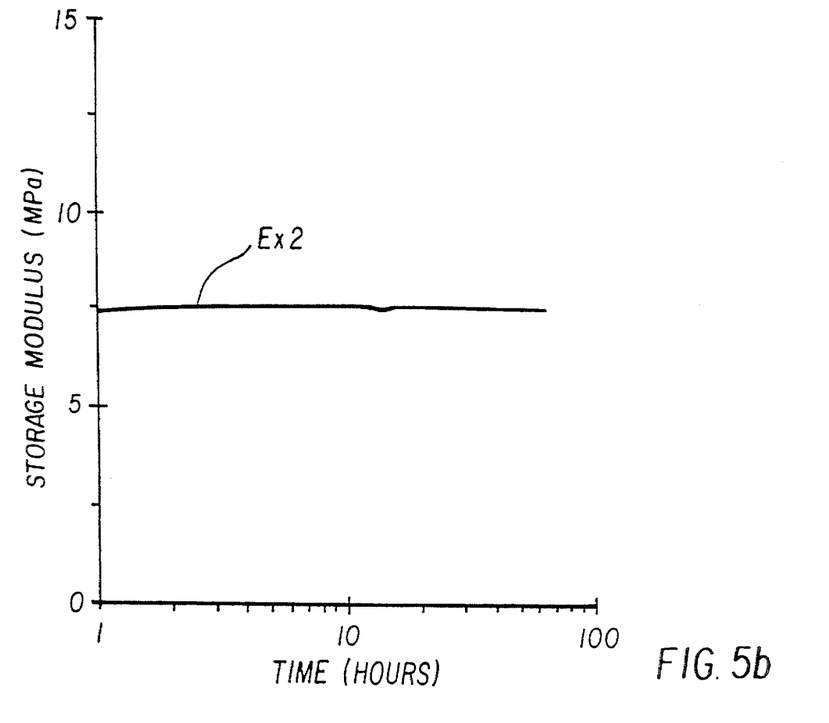
FIG. 5b is a graph of storage modulus vs. time for the material of Example 2.
Figure 6:
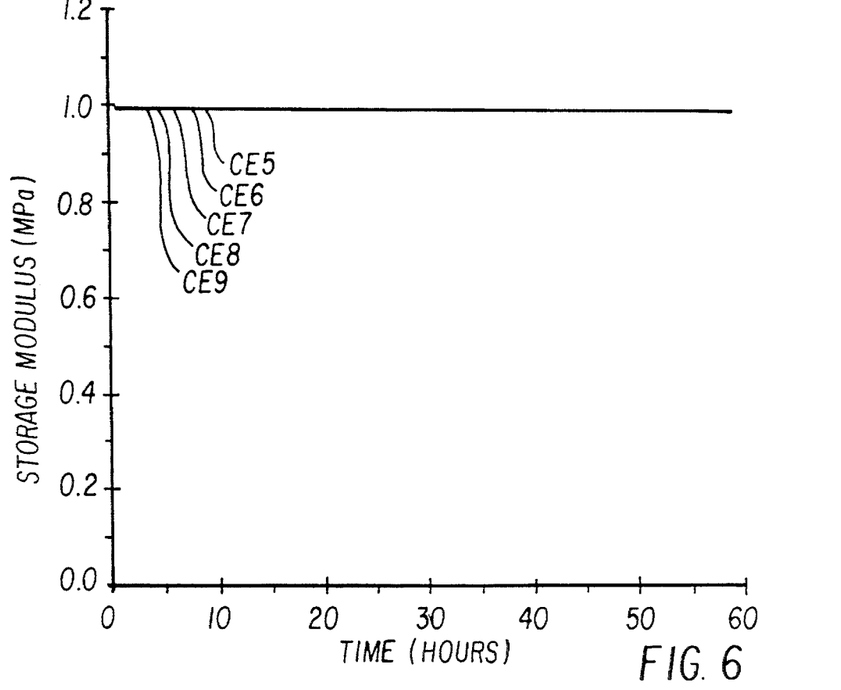
FIG. 6 is a graph of fractional length vs. time for the materials of Comparative Examples 5–9.
Figure 7:
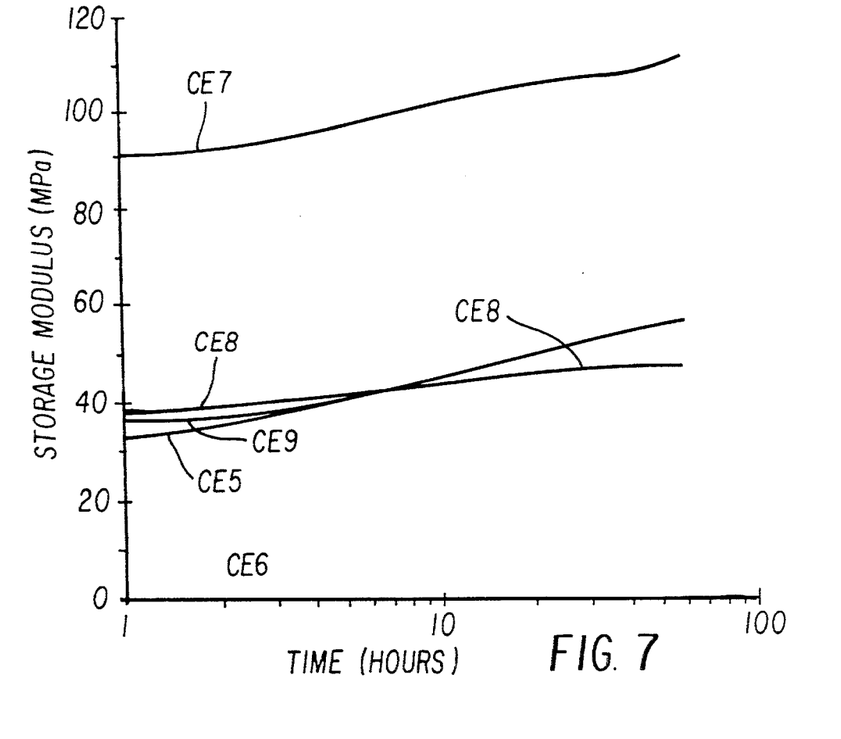
FIG. 7 is a graph of storage modulus vs. time for the materials of Comparative Examples 5–9.
Figure 8:
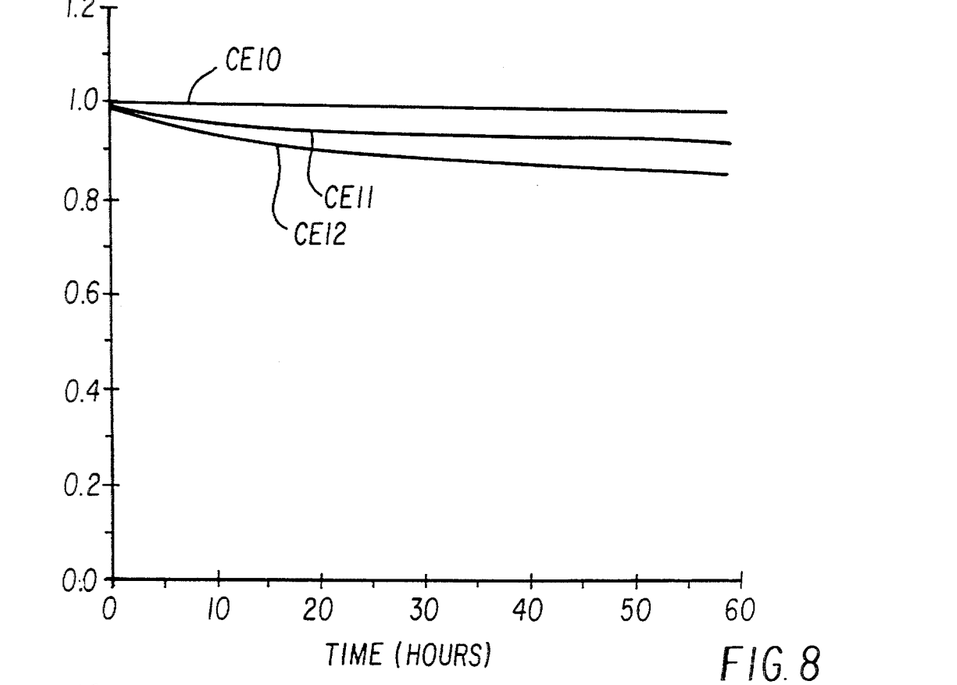
FIG. 8 is a graph of fractional length vs. time for the materials of Comparative Examples 10–12.
Figure 9:
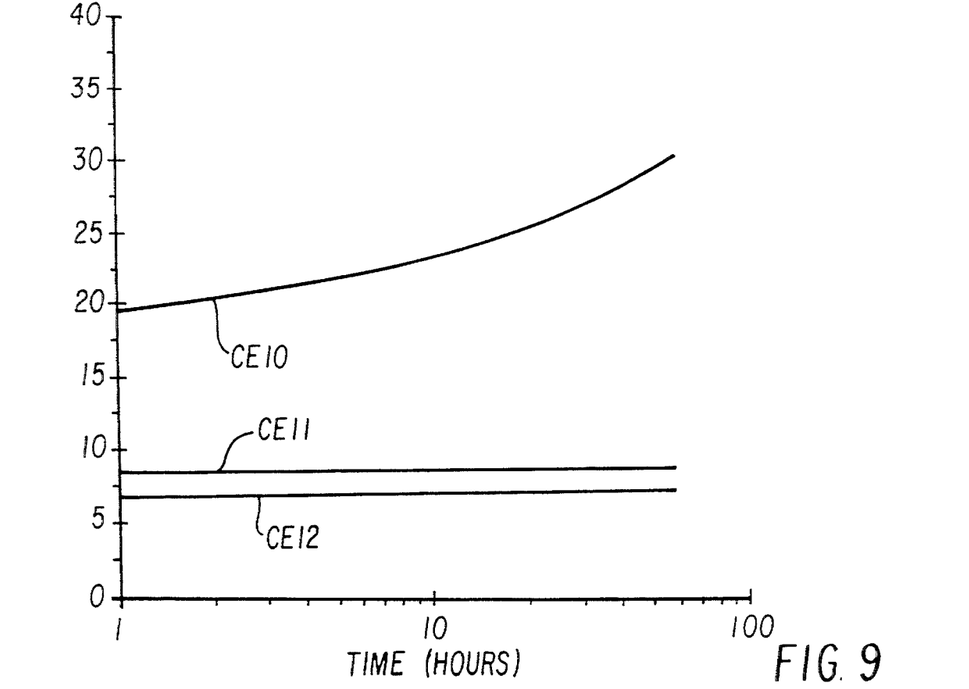
FIG. 9 is a graph of storage modulus vs. time for the materials of Comparative Examples 10–12.

The storage modulus determination was done in accordance with the method of calculation described in Fitzgerald, et al., "The Effect of Cyclic Stress on the Physical Properties of a Poly(dimethylsiloxane) Elastomer", Polymer Engineering and Science, Vol. 32, No. 18 (September, 1992), pp. 1350–1357. Six of the circular disks were stacked, one upon the other, weighed, and then placed in a test instrument called a Mechanical Energy Resolver (also referred to herein as an "MER"), commercially available from Instrumentors, Inc. Strongsville, Ohio, U.S.A. The instrument heated the stack to 218° C. and imposed a static compressive force of 8 kg on the stack. The length of the stack under the initial compressive force was then measured, as was the initial hardness (expressed in terms of "Initial storage modulus"). The MER then imposed cyclic stress on the sample stack by sinusoidally varying the initial compressive force by 4 kg rms at a frequency of 30 Hz for 60 hours, while maintaining the 218° C. temperature. After 60 hours, the final hardness ("Final storage modulus") and length of the six-disk stack under the static 8 kg compressive force were measured, as was the final weight of the sample stack. Results are presented in FIGS. 1–3 and Table 2.

EXAMPLE 3

A sample slab of fluorocarbon elastomer was prepared in substantially the same manner as in Example 1 except tin oxide was added to provide a volume concentration of 35 volume percent. A slab was prepared and circular disks (12 mm diameter) were cut from the slab. Thermal conductivity of the disks was measured in accordance with ASTM F433–77 and was found to be 0.38 BTU/hr·ft·°F.

COMPARATIVE EXAMPLES 1–12

Substantially the same procedures were followed as in Example 1, except that the fluorocarbon polymer was changed as indicated in Table 1. Results are presented in FIGS. 1–2 and 4–9 and Table 2.

TABLE 1

| Example or Comparative Example | Fluorocarbon | Additional filler |
|---|---|---|
| Ex 1 | Viton A | 30 vol % tin oxide |
| Ex 2 | FX-2530 | 30 vol % tin oxide |
| Comp Ex 1 | Viton A | 30 vol % zinc oxide |
| Comp Ex 2 | Viton A | 30 vol % aluminum oxide |
| Comp Ex 3 | FX-2530 | 30 vol % zinc oxide |
| Comp Ex 4 | FX-2530 | 30 vol % aluminum oxide |
| Comp Ex 5 | Viton A | 35 vol % chromium oxide |
| Comp Ex 6 | Viton A | 35 vol % copper oxide |
| Comp Ex 7 | Viton A | 35 vol % titanium oxide |
| Comp Ex 8 | Viton A | 35 vol % zirconium oxide |
| Comp Ex 9 | Viton A | 35 vol % calcium oxide |
| Comp Ex 10 | FX-2530 | 35 vol % calcium oxide |
| Comp Ex 11 | FX-2530 | 35 vol % copper oxide |
| Comp Ex 12 | FX-2530 | 35 vol % chromium oxide |

TABLE 2

| Ex or Comp Ex | Initial storage modulus (MPa) | Final storage modulus (MPa) | Change in storage modulus (%) | Change in length (%) | Weight loss (%) |
|---|---|---|---|---|---|
| Ex 1 | 22.648 | 27.59 | 20 | 0.19 | 0.40 |
| Ex 2 | 10.127 | 10.3 | 1.7 | 4.8 | 0.33 |
| Comp Ex 1 | 19.642 | 40.4 | 105 | 2.5 | 0.47 |
| Comp Ex 2 | 12.359 | 12.54 | 11.5 | 2.2 | 0.73 |
| Comp Ex 3 | 9.42 | 9.28 | 1.5 | 4.3 | 0.61 |
| Comp Ex 4 | 8.55 | 8.29 | 3.0 | 3.4 | 0.49 |
| Comp Ex 5 | 27.60 | 48.32 | 75 | 1.7 | 0.90 |
| Comp Ex 6 | 15.44 | 19.07 | 23.5 | 2.2 | 1.13 |
| Comp Ex 7 | 80.49 | 111.8 | 38.9 | 0.8 | 1.34 |
| Comp Ex 8 | 33.03 | 47.9 | 45.0 | 1.2 | 0.81 |
| Comp Ex 9 | 31.20 | 56.4 | 80.7 | 1.2 | 0.02 |
| Comp Ex 10 | 17.09 | 30.3 | 75.5 | 1.3 | 0.15 |
| Comp Ex 11 | 8.37 | 8.34 | 0.3 | 8.5 | 0.29 |
| Comp Ex 12 | 6.70 | 6.87 | 2.5 | 15.0 | 0.25 |

The invention has been described in detail with particular reference to certain preferred embodiments thereof, but it should be appreciated that variations and modifications can be effected within the scope of the invention.

What is claimed is:

1. A fuser member comprising: a core and a layer overlying said core, said layer comprising a cured fluorocarbon random copolymer comprising subunits having the general structures:

and wherein
x is from 30 to 90 mole percent,
y is from 10 to 70 mole percent, and
z is from 0 to 34 mole percent;
said layer further comprising particulate filler, said particulate filler including tin oxide and a material selected from the group consisting of alkali metal oxides, alkali metal hydroxides, and combinations thereof; said particulate filler having a total concentration in said layer of from about 25 to 50 percent of the total volume of said layer, said tin oxide having a concentration of from 20 to 40 percent of the total volume of said layer.

2. The fuser member of claim 1 wherein said alkali metal hydroxide comprises calcium hydroxide and said alkali metal oxide comprises magnesium oxide.

3. The fuser member of claim 1 wherein said polymer is nucleophilic addition cured.

4. The fuser member of claim 1 wherein said polymer is crosslinked by biphenolic residues.

5. The fuser member of claim 1 wherein x is from 40 to 80 mole percent, y is from 10 to 60 mole percent, and z is from 0 to 34 mole percent.

6. The fuser member of claim 1 wherein x is from 42 to 75 mole percent, y is from 14 to 58 mole percent, and z is 0.

7. The fuser member of claim 1 wherein z is 0.

8. The fuser member of claim 1 wherein x is greater than 40 mole percent.

9. A fuser member useful for heat-fixing an electrographic toner to a substrate, said fuser member comprising: a core, a base cushion superimposed on said core and an outer layer superimposed on said base cushion, said outer layer comprising a bisphenol cured fluorocarbon random copolymer comprising subunits having the general structures:

and wherein x, y, and z are selected such that fluorine atoms represent at least 70 percent of the total formula weight of said subunits;

said outer layer having filler particles dispersed therein, said filler particles further comprising:

particles selected from the group consisting of alkali metal oxides and alkali metal hydroxides in a concentration of from about 5 to 20 percent of the total volume of said outer layer; and tin oxide particles in a concentration of from 20 to 40 percent of the total volume of said outer layer.

10. The fuser member of claim 9, wherein the concentration of tin oxide particles is from 30 to 40 percent of the total volume of said outer layer.

11. A fuser member useful for heat-fixing an electrographic toner to a substrate, wherein said fuser member comprises a core, a base cushion layer overlying said core, and an outer layer superimposed on said base cushion, said outer layer comprising a cured fluorocarbon random copolymer comprising subunits having the general structures:

and wherein
x is from 10 to 90 mole percent,
y is from 10 to 70 mole percent, and
z is from 0 to 34 mole percent;
said outer layer further comprising particulate filler, said particulate filler including tin oxide and a material selected from the group consisting of alkali metal oxides, alkali metal hydroxides, and combinations thereof; said particulate filler having a total concentration in said outer layer of from about 25 to 50 percent of the total volume of said outer layer, said tin oxide having a concentration of from 20 to 40 percent of the total volume of said outer layer.

* * * * *

UNITED STATES PATENT AND TRADEMARK OFFICE
CERTIFICATE OF CORRECTION

PATENT NO. : 5,464,698
DATED : November 7, 1995
INVENTOR(S) : Jiann H. Chen, John J. Fitzgerald, William B. Vreeland II, Wayne T. Ferrar, Gary F. Roberts and William J. Staudenmayer It is certified that error appears in the above-indentified patent and that said Letters Patent is hereby corrected as shown below:

Title page; Abstract, lines 12 and 13;
Please delete "alkali" and insert -- alkaline --

Column 4, lines 65 and 66    Please delete "alkali" and insert -- alkaline --

Column 6, lines 14 and 15    Please delete "alkali" and insert -- alkaline --

Column 11, lines 13, 20 and 21    Please delete "alkali" and insert -- alkaline --

Column 12, lines 7, 8 and 42    Please delete "alkali" and insert -- alkaline --

Signed and Sealed this

Twenty-sixth Day of August, 1997

Attest:

BRUCE LEHMAN

*Attesting Officer*    Commissioner of Patents and Trademarks